US012248263B2

(12) United States Patent
Harashima

(10) Patent No.: US 12,248,263 B2
(45) Date of Patent: Mar. 11, 2025

(54) IMAGE FORMING APPARATUS,ADJUSTMENT METHOD AND NON-TRANSITORY COMPUTER-READABLE RECORDING MEDIUM ENCODED WITH ADJUSTMENT PROGRAM

(71) Applicant: Konica Minolta, Inc., Tokyo (JP)

(72) Inventor: Takashi Harashima, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 50 days.

(21) Appl. No.: 18/309,996

(22) Filed: May 1, 2023

(65) Prior Publication Data

US 2023/0367247 A1 Nov. 16, 2023

(30) Foreign Application Priority Data

May 10, 2022 (JP) ................................ 2022-077786

(51) Int. Cl.
*G03G 15/20* (2006.01)
*G03G 15/00* (2006.01)

(52) U.S. Cl.
CPC ..... *G03G 15/2064* (2013.01); *G03G 15/2039* (2013.01); *G03G 15/50* (2013.01)

(58) Field of Classification Search
CPC ........... G03G 15/2017; G03G 15/2032; G03G 15/2039; G03G 15/2053; G03G 15/2064
See application file for complete search history.

(56) References Cited

U.S. PATENT DOCUMENTS

2011/0222875 A1* 9/2011 Imada ................ G03G 15/2025 399/33

FOREIGN PATENT DOCUMENTS

JP 2011-191520 A 9/2011
JP 2019-007989 A 1/2019

OTHER PUBLICATIONS

JP 2019007989 English machine translation, Okamoto et al., Jan. 17, 2019 (Year: 2019).*

* cited by examiner

*Primary Examiner* — Thomas S Giampaolo, II
(74) *Attorney, Agent, or Firm* — LUCAS & MERCANTI, LLP

(57) ABSTRACT

An image forming apparatus includes a pressure roller, a driver that drives rotation of the pressure roller, an endless fixing belt, a pressing member that is provided inside the fixing belt and opposite to the pressure roller and forms a nip portion in which the fixing belt and the pressure roller come into contact with each other, a pressing force adjustment mechanism that adjusts a pressing force for pressing one of the pressure roller and the pressing member toward another one of the pressure roller and the pressing member, and a drive controller that controls the pressing force adjustment mechanism and the driver to rotate the pressure roller with the pressing force being smaller than a normal value defined for a normal state.

13 Claims, 8 Drawing Sheets

IMAGE FORMING APPARATUS,ADJUSTMENT METHOD AND NON-TRANSITORY COMPUTER-READABLE RECORDING MEDIUM ENCODED WITH ADJUSTMENT PROGRAM

The entire disclosure of Japanese patent Applications No. 2022-077786 filed on May 10, 2022 is incorporated herein by reference in its entirety.

BACKGROUND

Technological Field

The present invention relates to an image forming apparatus, an adjustment method and a non-transitory computer-readable recording medium encoded with an adjustment program. In particular, the present invention relates to an image forming apparatus that fixes toner to a recording medium by applying pressure and heat to the recording medium, an adjustment method performed in the image forming apparatus and a non-transitory computer-readable recording medium encoded with an adjustment program that causes a computer controlling the image forming apparatus to perform the adjustment method.

Description of the Related Art

An image forming apparatus such a copying machine, a printer or a facsimile machine is provided with a fixing device that fixes toner on a paper by applying pressure and heat to the paper on which an image made of toner is formed.

For example, Japanese Patent Laid-Open No. 2019-7989 describes an image forming apparatus that is characterized in comprising a fixing device that is installed to be attachable to and detachable from the main body of an image forming apparatus and is configured to form a nip portion in which a sheet is conveyed with a fixing rotating body and a pressure rotating body pressed against each other, and a nip pressure variable mechanism that changes the nip pressure between the fixing rotating body and the pressure rotating body in the nip portion, wherein an aging mode in which the nip pressure is changed and the fixing device is idly driven during non-image formation is executed when it is identified that the fixing device is brand-new, and an adjustment mode in which the nip pressure is changed and the fixing device is idly driven during the non-image formation is executed each time a cumulative traveling distance or a cumulative driving period of time of the fixing device reaches a predetermined value.

The image forming apparatus described in Japanese Patent Laid-Open No. 2019-7989 is configured such that the inner peripheral surface of an endless fixing belt slides on a nip forming member in the fixing rotating body. Due to the execution of the aging mode, a lubricant present in the portion in which the fixing belt and the nip forming member slide on each other is spread over the entire inner peripheral surface of the fixing belt 21.

However, in the image forming apparatus described in Japanese Patent Laid-Open No. 2019-7989, although the aging mode is executed for a certain period of time, it is not detected whether the lubricant is sufficiently applied to the entire inner peripheral surface of the fixing belt. Therefore, in a case in which the temperature is low and the viscosity of the lubricant is high, the lubricant may not be sufficiently applied to the entire inner circumferential surface of the fixing belt after the end of the aging mode. Further, in a case in which the temperature is high and the viscosity of the lubricant is low, the lubricant may be sufficiently applied to the entire inner circumferential surface of the fixing belt in the middle of the aging mode. In this case, the aging mode is executed for a period longer than necessary.

SUMMARY

According to one aspect of the present invention, an image forming apparatus includes a pressure roller, a driver that drives rotation of the pressure roller, an endless fixing belt, a pressing member that is provided inside the fixing belt and opposite to the pressure roller and forms a nip portion in which the fixing belt and the pressure roller come into contact with each other, a pressing force adjustment mechanism that adjusts a pressing force for pressing one of the pressure roller and the pressing member toward another one of the pressure roller and the pressing member, and a drive controller that controls the pressing force adjustment mechanism and the driver to rotate the pressure roller with the pressing force being smaller than a normal value defined for a normal state.

According to another aspect of the present invention, an adjustment method is performed to control an image forming apparatus, wherein the image forming apparatus includes a pressure roller, a driver that drives rotation of the pressure roller, an endless fixing belt, a pressing member that is provided inside the fixing belt and opposite to the pressure roller and forms a nip portion in which the fixing belt and the pressure roller come into contact with each other, and a pressing force adjustment mechanism that adjusts a pressing force for pressing one of the pressure roller and the pressing member toward another one of the pressure roller and the pressing member, and the adjustment method includes a pressing force adjustment step of controlling the pressing force adjustment mechanism to cause the pressing force to be smaller than a normal value defined for a normal state, and a drive controlling step of controlling the driver to rotate the pressure roller with the pressing force being smaller than the normal value.

According to yet another aspect of the present invention, a non-transitory computer-readable recording medium is encoded with an adjustment program executed in a computer that controls an image forming apparatus, and the image forming apparatus includes a pressure roller, a driver that drives rotation of the pressure roller, an endless fixing belt, a pressing member that is provided inside the fixing belt and opposite to the pressure roller and forms a nip portion in which the fixing belt and the pressure roller come into contact with each other, and a pressing force adjustment mechanism that adjusts a pressing force for pressing one of the pressure roller and the pressing member toward another one of the pressure roller and the pressing member, and the adjustment program causes the computer to perform a pressing force adjustment step of controlling the pressing force adjustment mechanism to cause the pressing force to be smaller than a normal value defined for a normal state, and a drive controlling step of controlling the driver to rotate the pressure roller with the pressing force being smaller than the normal value.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
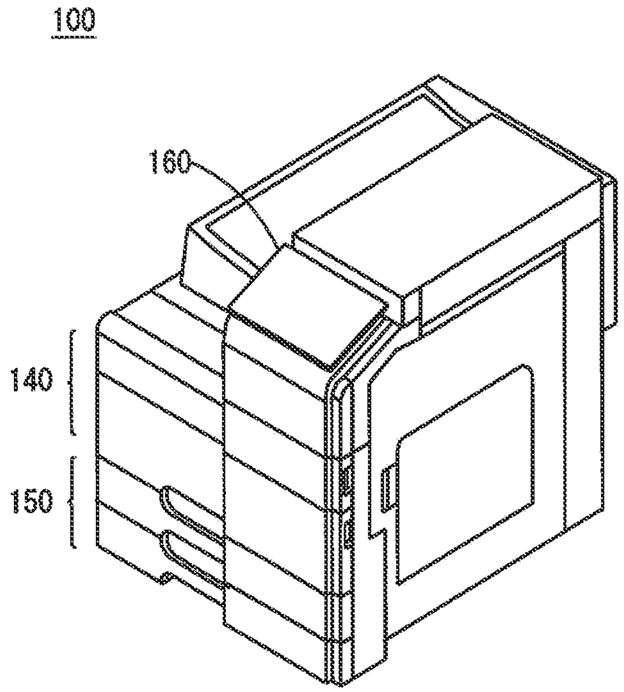
FIG. 1 is a first perspective view showing the appearance of a printer in one embodiment of the present invention.

Hereinafter, one or more embodiments of the present invention will be described with reference to the drawings. However, the scope of the invention is not limited to the disclosed embodiments.

Embodiments of the present invention will be described below with reference to the drawings. In the following description, the same parts are denoted with the same reference characters. Their names and functions are also the same. Thus, a detailed description thereof will not be repeated.

Figure 2:
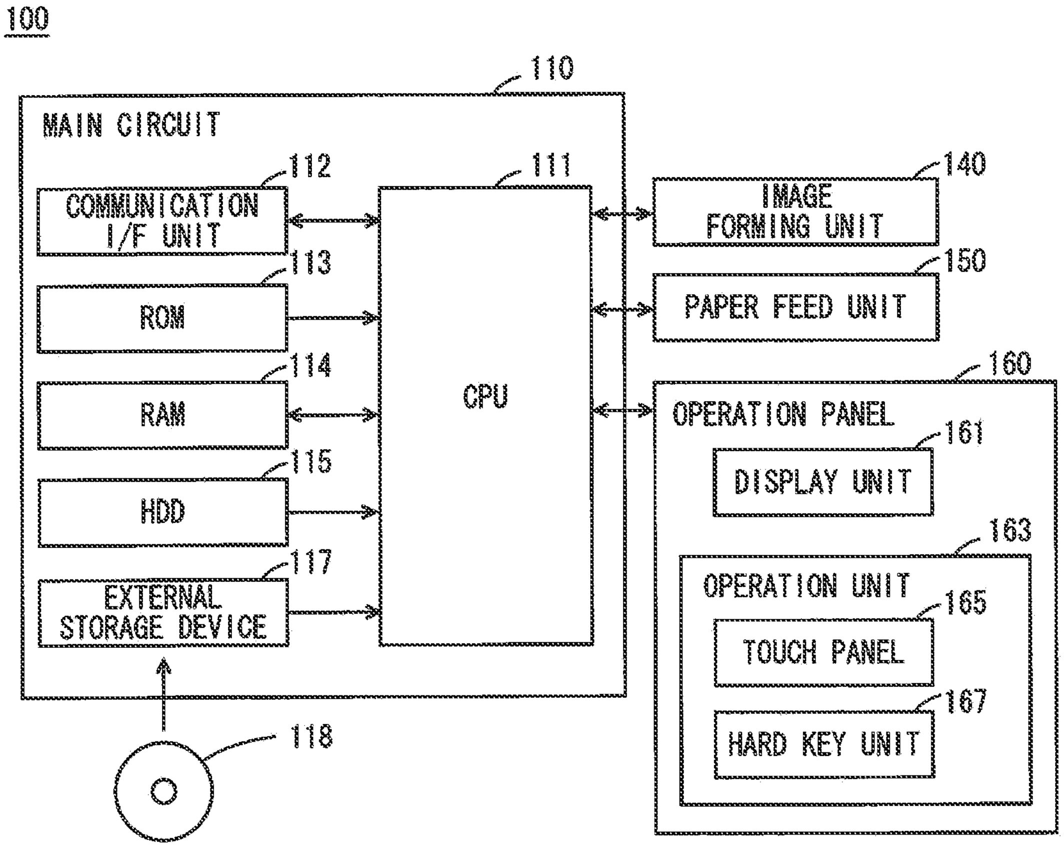
FIG. 2 is a block diagram showing one example of the hardware configuration of the printer.

FIG. 1 is a first perspective view showing the appearance of a printer in one embodiment of the present invention. FIG. 2 is a block diagram showing one example of the hardware configuration of the printer. Referring to FIGS. 1 and 2, the printer 100 is one example of an image forming apparatus and includes a main circuit 110, an image forming unit 140 for forming an image on a paper (a sheet of paper) based on image data, a paper feed unit 150 for supplying a paper to the image forming unit 140 and an operation panel 160 serving as a user interface.

The main circuit 110 includes a CPU (Central Processing Unit) 111 for controlling the printer 100 as a whole, a communication interface (I/F) unit 112, a ROM (Read Only Memory) 113, a RAM (Random Access Memory) 114, a Hard Disc Drive (HDD) 115 that is used as a mass storage device and an external storage device 117. The CPU 111 is connected to the image forming unit 140, the paper feed unit 150 and the operation panel 160, and controls the printer 100 as a whole.

The paper feed unit 150 conveys papers stored in a paper feed cassette to the image forming unit 140. The image forming unit 140 is controlled by the CPU 111 and forms an image using a well-known electrophotographic technique, forms an image on a paper conveyed by the paper feed unit 150 based on the image data received from the CPU 111 and discharges the paper having an image formed thereon to a paper discharge tray 39. The image data that is output by the CPU 111 to the image forming unit 140 includes image data such as print data received from an external personal computer or the like.

The ROM 113 stores a program to be executed by the CPU 111 or data required for execution of the program. The RAM 114 is used as a work area when the CPU 111 executes a program.

The operation panel 160 is provided on an upper surface of the printer 100. The operation panel 160 includes a display unit 161 and an operation unit 163. The display unit 161 is a Liquid Crystal Display (LCD) device, for example, and displays an instruction menu for a user, information about acquired image data, etc. As long as displaying images, an organic EL (Electroluminescence) display, for example, can be used instead of an LCD.

The operation unit 163 includes a touch panel 165 and a hard key unit 167. The hard key unit 167 includes a plurality of hard keys. The hard keys are contact switches, for example. The touch panel 165 detects a position designated by the user on the display surface of the display unit 161.

The communication OF unit 112 is an interface for connecting the printer 100 to a network. The communication I/F unit 112 communicates with another computer connected to the network using a communication protocol such as TCP (Transmission Control Protocol) or UDP (File Datagram Protocol). The network to which the communication I/F unit 112 is connected is a Local Area Network (LAN), either wired or wireless. Further, the network is not limited to a LAN and may be a Wide Area Network (WAN), a Public Switched Telephone Network (PSTN), the Internet or the like.

The external storage device 117 is controlled by the CPU 111 and mounted with a CD-ROM (Compact Disk Read Only Memory) 118 or a semiconductor memory. While the CPU 111 executes a program stored in the ROM 113 by way of example in the present embodiment, the CPU 111 may control the external storage device 117, read out a program to be executed by the CPU 111 from the CD-ROM 118 and store the read program in the RAM 114 for execution.

It is noted that a recording medium for storing a program to be executed by the CPU 111 is not limited to the CD-ROM 118. It may be a flexible disc, a cassette tape, an optical disc (MO (Magnetic Optical Disc)/MD (Mini Disc)/DVD (Digital Versatile Disc)), an IC card, an optical card, and a semiconductor memory such as a mask ROM and an EPROM (Erasable Programmable ROM). Further, the CPU 111 may download a program from a computer connected to the network and store the program in the HDD 115, or the computer connected to the network may write the program in the HDD 115. Then, the program stored in the HDD 115 may be loaded into the RAM 114 to be executed by the CPU 111. The program referred to here includes not only a program directly executable by the CPU 111 but also a source program, a compressed program, an encrypted program and the like.

Figure 3:
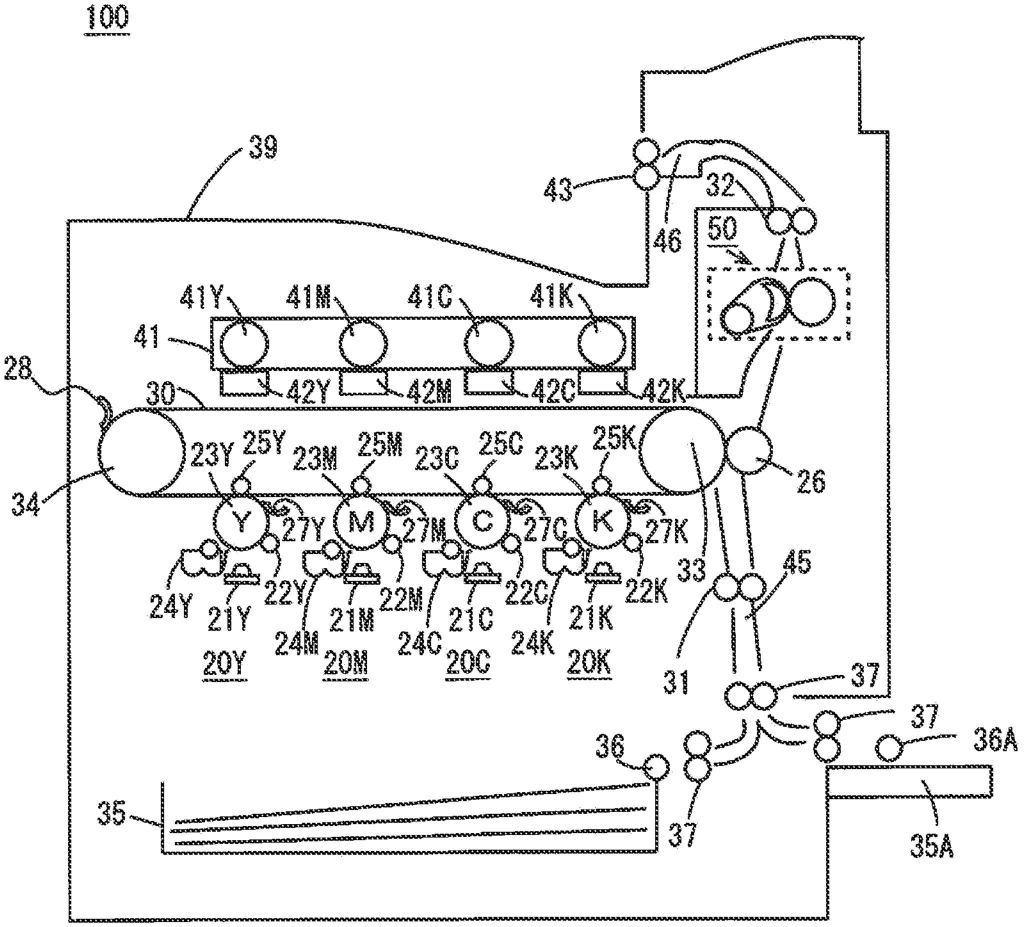
FIG. 3 is a cross sectional view schematically showing one example of the inner configuration of the printer.

FIG. 3 is a cross sectional view schematically showing one example of the internal configuration of the printer. For the sake of explanation, in the following description, the direction that extends to the left and right in FIG. 3 is referred to as a left-and-right direction, and the direction that extends to the front and rear in FIG. 3 is referred to as a depth direction. In regard to the left-and-right direction, the direction directed from the left to the right is referred to as a right-surface direction, and the direction directed from the right to the left is referred to as a left-surface direction. In regard to the depth direction, the direction directed from a front surface toward a rear surface is referred to as a front-surface direction, and the direction directed from the rear surface toward the front surface is referred to as a rear-surface direction.

The printer 100 includes respective image forming units 20Y, 20M, 20C, 20K for respective yellow, magenta, cyan and black. Here, “Y,” “M,” “C” and “K” represent yellow, magenta, cyan and black, respectively. The printing data for yellow, magenta, cyan and black are respectively input to the image forming units 20Y, 20M, 20C, 20K. The only difference among the image forming units 20Y, 20M, 20C, 20K is the color of toner used by the image forming units 20Y, 20M, 20C, 20K. Therefore, the image forming unit 20Y for forming an image in yellow will be described here.

The image forming unit 20Y includes an exposure device 21Y to which printing data for yellow is input, a photoreceptor drum 23Y which is an image carrier, a charging roller 22Y for uniformly charging the surface of the photoreceptor drum 23Y, a developer 24Y, a primary transfer roller 25Y for transferring toner images formed on the photoreceptor drum 23Y onto an intermediate transfer belt 30 which is an image carrier using the effect of an electric field force, a drum cleaning blade 27Y for removing transfer residual toner on the photoreceptor drum 23Y, a toner bottle 41Y and a toner hopper 42Y.

The toner bottle 41Y contains yellow toner. The toner bottle 41Y is rotated by a toner bottle motor that is used as a driving source to discharge the toner to the outside. The toner discharged from the toner bottle 41Y is supplied to the toner hopper 42Y. The toner hopper 42Y supplies the toner to the developer 24Y in response to a remaining amount of toner contained in the developer 24Y becoming equal to or smaller than a predetermined lower limit value.

Around the photoreceptor drum 23Y, the charging roller 22Y, the exposure device 21Y, the developer 24Y, the primary transfer roller 25Y and the drum cleaning blade 27Y are arranged in this order in the rotation direction of the photoreceptor drum 23Y.

After being electrically charged by the charging roller 22Y, the photoreceptor drum 23Y is irradiated with laser light emitted by the exposure device 21Y. The exposure device 21Y forms an electrostatic latent image by exposing a portion corresponding to an image on the surface of the photoreceptor drum 23Y. Thus, the electrostatic latent image is formed on the photoreceptor drum 23Y. Subsequently, the developer 24Y develops the electrostatic latent image formed on the photoreceptor drum 23Y with the charged toner. Specifically, the toner is placed on the electrostatic latent image formed on the photoreceptor drum 23Y by the effect of an electric field force, whereby toner images are formed on the photoreceptor drum 23Y. The toner images formed on the photoreceptor drum 23Y are transferred onto the intermediate transfer belt 30, which is an image carrier, with the effect of an electric field force by the primary transfer roller 25Y. The toner remaining on the photoreceptor drum 23Y without being transferred is removed from the photoreceptor drum 23Y by the drum cleaning blade 27Y.

On the other hand, the intermediate transfer belt 30 is suspended by a driving roller 33 and a driven roller 34 so as not to loosen. When the driving roller 33 is rotated in an anti-clockwise direction in FIG. 2, the intermediate transfer belt 30 is rotated in the anti-clockwise direction in the diagram at a predetermined speed. The driven roller 34 is rotated in the anti-clockwise direction due to the rotation of the intermediate transfer belt 30.

Thus, the image forming units 20Y, 20M, 20C, 20K sequentially transfer toner images onto the intermediate transfer belt 30. Timing for transferring toner images onto the intermediate transfer belt 30 by the respective image forming units 20Y, 20M, 20C, 20K is adjusted by detection of a reference mark provided on the intermediate transfer belt 30. Thus, toner images in yellow, magenta, cyan and black are superimposed on the intermediate transfer belt 30.

The toner images formed on the intermediate transfer belt 30 are transferred onto a paper with the effect of an electric field force by a secondary transfer roller 26 which is a transfer member. A paper conveyed by a timing roller 31 is conveyed to a nip portion in which the intermediate transfer belt 30 and the secondary transfer roller 26 come into contact with each other. A paper on which toner images are formed is conveyed to a fixing device 50 to be heated and pressurized. Thus, the toner is fused and fixed to the paper. Thereafter, the paper is discharged to the paper discharge tray 39.

A belt cleaning blade 28 is provided at a position farther upstream than the image forming unit 20Y of the intermediate transfer belt 30. The belt cleaning blade 28 removes the toner remaining on the intermediate transfer belt 30 without being transferred to the paper.

While driving all of the image forming units 20Y, 20M, 20C, 20K in a case in which forming a full-color image, the printer 100 drives any one of the image forming units 20Y, 20M, 20C, 20K in a case in which forming a monochrome image. It is also possible to form an image by combining two or more of the image forming units 20Y, 20M, 20C, 20K. While using a tandem-system including the image forming units 20Y, 20M, 20C, 20K that respectively form toner on a paper in four colors by way of example, the printer 100 may use a four-cycle system that sequentially transfers the toner of four colors onto the paper using one photoreceptor drum.

A plurality of papers are set in the paper feed cassette 35. The papers contained in the paper feed cassette 35 are sequentially supplied to a conveyance path 45 one by one by a pickup roller 36 attached to the paper feed cassette 35 and are sent to the timing roller 31 by a paper feed roller 37. Further, in a case in which being set in a manual feed cassette 35A, one or more papers set in the manual feed cassette 35A are sequentially supplied to the conveyance path 45 one by one by a pickup roller 36A attached to the manual feed cassette 35A and sent to the timing roller 31 by the paper feed roller 37.

Figure 4:
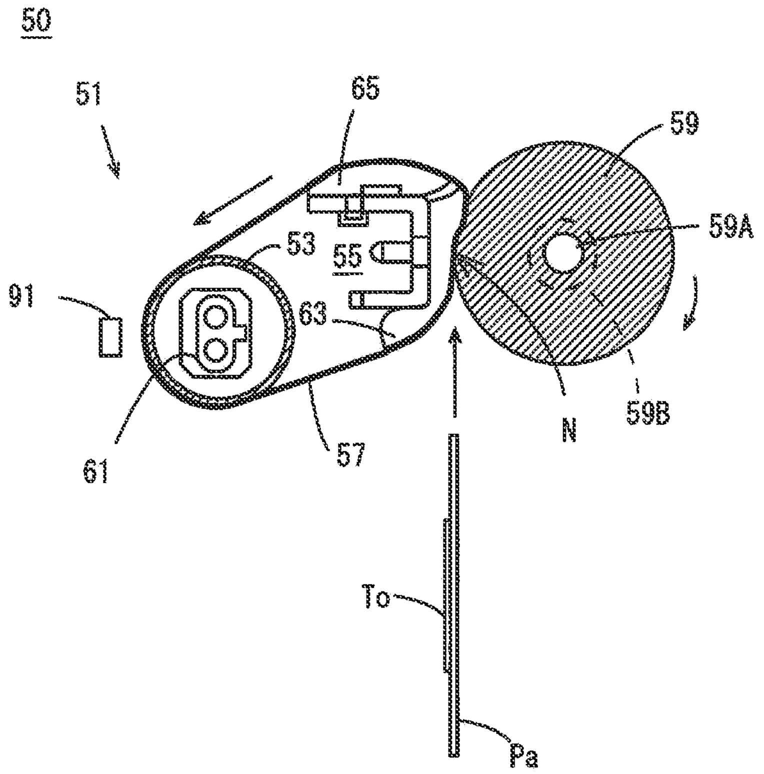
FIG. 4 is a cross sectional view of a fixing device.

FIG. 4 is a cross sectional view of the fixing device. FIG. 4 shows a cross section of the fixing device 50 taken along the plane that takes a rotation shaft 59A of the pressure roller 59 as a normal line. Referring to FIG. 4, the fixing device 50 includes a heater 51 and the pressure roller 59. The heater 51 is provided so as to be opposite to the pressure roller 59 and forms a nip portion N between the heater 51 and the pressure roller 59. The nip portion N is a portion in which the heater 51 and the pressure roller 59 come into contact with each other. The pressure roller 59 is pressurized toward the heater 51 with a predetermined pressing force.

A paper Pa carrying a toner image To on its surface is conveyed from below the fixing device 50 to above the fixing device 50, and the paper Pa passes through the nip portion N. During a period in which the paper Pa passes through nip portion N, the paper Pa is heated and pressurized by the pressure roller 59 and the heater 51, and the toner image To is fixed to the paper Pa.

The pressure roller 59 includes a cored bar, an intermediate layer and a surface layer. In the present embodiment, the outer diameter of the pressure roller 59 is 30 mm. The cored bar is made of aluminum or iron, and the thickness of the cored bar is 2 to 3 mm. The intermediate layer is an elastic layer and is formed of a material having heat resistance and elasticity, such as silicone rubber or silicone sponge. The thickness of the intermediate layer is preferably about 2 to 5 mm. The surface layer is formed of a material having releasability such as a fluorine tube, and the thickness of the surface release layer is preferably about 20 to 80 μm.

The heater 51 includes a heating roller 53, a pressurizer 55, an endless fixing belt 57 and a thermistor 91. The fixing belt 57 is an endless belt having flexibility. The fixing belt 57 is suspended by the heating roller 53 and the pressurizer 55 so as not to be loosened. The fixing belt 57 includes a base layer and an elastic layer. The base layer is formed of a polyimide film having the inner diameter of 40 mm, the width of 340 mm and the thickness of 70 μm. The elastic layer is preferably formed of silicone rubber and preferably has a thickness of 100 to 150 μm. Further, the surface layer is formed of PFA or PTFE having releasability and is a coating having the thickness of about 30 μm. The surface layer is formed by coating of the elastic layer with a fluororesin.

The heating roller 53 is driven to be rotated by rotation of the fixing belt 57. Note that the heating roller 53 may be prevented from being rotated, and the fixing belt 57 may slide on the surface of the heating roller 53.

The pressurizer 55 includes a pressing member 63 and a grease applier 65. The pressing member 63 is formed of a resin member having heat resistance, and has a shape the length of which is equal to or larger than at least the maximum paper width of a paper to be subjected to a fixing process. The pressing member 63 is fixed to a main body frame. In the pressing member 63, a portion corresponding to the nip portion N has a shape approximate to the curvature of the pressure roller 59. Therefore, it is possible to increase the area of the nip portion N as much as possible while reducing an amount of elastic deformation of the pressure roller 59. Because the area of the nip portion N can be increased, a period of time required for pressurizing and heating a paper can be increased. Further, because the outer diameter of the pressure roller 59 can be set to a value equal to or smaller than a predetermined value, the fixing device 50 can be miniaturized. Further, because an amount of elastic deformation of the pressure roller 59 can be reduced, a pressing force for pressurizing the pressure roller 59 can be reduced. Therefore, because the strength of the pressure roller 59 can be set equal to or smaller than a predetermined value, the thickness of the pressure roller 59 can be reduced, and the heat capacity can be reduced. Further, because the heat capacity of the pressure roller 59 can be reduced, the power consumption is reduced.

A sliding sheet is fixed to a position close to the nip portion N of the pressing member 63 in order to enhance the slidability of the surface of the pressing member 63. The material of the sliding sheet is a glass cloth having heat resistance and being coated with a fluororesin, and has heat resistance, abrasion resistance and slidability. The fixing belt 57 comes into contact with the sliding sheet. Therefore, the degree of wear of the fixing belt 57 caused by friction can be reduced as much as possible.

The grease applier 65 accumulates grease which is a lubricant, and the grease is applied to the fixing belt 57 in a portion of the grease applier 65 that comes into contact with the fixing belt 57. During a period in which the fixing belt 57 passes through the grease applier 65, the grease is applied to the inner surface of the fixing belt 57 by friction between the fixing belt 57 and the grease applier 65. Thus, because the frictional resistance received by the fixing belt 57 from the pressing member 63 is reduced, a load received by the pressure roller 59 for rotation of the fixing belt 57 around the heating roller 53 and the pressurizer 55 is reduced.

The heating roller 53 is a member having a hollow cylindrical shape and includes a heat source 61 therein. The inner diameter of the heating roller 53 is set to a size such that the heat source 61 does not come into contact with the heating roller 53. The heating roller 53 is made of stainless steel. Because the heating roller 53 is made of stainless steel, its strength is ensured, and the heating roller 53 is easily processed. In this case, the thickness of the heating roller 53 can be about 0.1 mm to 0.2 mm. The heating roller 53 may be made of aluminum. In this case, in order to ensure strength against bending or local deformation, it is preferable that the thickness of the heating roller 53 is equal to or larger than 0.25 mm. Further, the heating roller 53 may be made of iron-based metal such as STKM (carbon steel tubes for machine structural purposes).

The heat source 61 is a halogen heater, for example. In the present embodiment, two halogen heaters having different emission lengths are used as the heat source 61. The heat source 61 is not limited to a halogen heater, and a resistance heating element or induction heating (IH) may be used.

When the heat source 61 generates heat, the heating roller 53 is heated, and the temperature of the heating roller 53 rises. The thermistor 91 detects the temperature of the heating roller 53. In accordance with a temperature detected by the thermistor 91, the heat source 61 is controlled to be turned on or off, and the heating roller 53 is controlled to have a predetermined temperature. The heat capacity of the heating roller 53 is reduced by a reduction in thickness of the heating roller 53. Therefore, because the rate at which the temperature of the heating roller 53 rises is increased, it is possible to shorten a warm-up period of time required for the heating roller 53 to reach the predetermined temperature. Further, the power consumption of the heat source 61 can be reduced.

The fixing belt 57 is heated to a predetermined temperature by heat transmitted from the heating roller 53 while being in contact with the heating roller 53.

The pressure roller 59 is rotated by a drive motor 59B. With the rotation of the pressure roller 59, the fixing belt 57 is driven to be rotated. The fixing belt 57 is heated by the heating roller 53 while being rotated. The paper Pa carrying the toner image To enters the nip portion N after the fixing belt 57 is heated to the predetermined temperature. The toner image To is fixed to the paper Pa by heat and pressure during a period in which the paper Pa passes through the nip portion N.

While the heat of the heating roller 53 is transmitted by conduction in order to heat the fixing belt 57 by way of example in the present embodiment, the fixing belt 57 may be heated with utilization of radiant heat radiated from the heating roller 53. In this case, the fixing belt 57 and the heating roller 53 do not need to come into contact with each other. Therefore, the fixing belt 57 does not need to be suspended by the heating roller 53 and the pressurizer 55. Specifically, the fixing belt 57 is pressurized between the pressurizer 55 and the pressure roller 59, and is supported by the pressurizer 55 and the pressure roller 59. Further, the fixing belt 57 slides with respect to the pressing member 63 as the pressure roller 59 is rotated. Thus, the fixing belt 57 is rotated around the pressurizer 55 and the heating roller 53.

Further, the heating roller 53 may be arranged outside of the fixing belt 57. In this case, the fixing belt 57 is rotated around the pressurizer 55. Further, the heating roller 53 does not need to have a columnar shape, and an induction heating device or a ceramic heater that functions as a heat source can be used.

The printer 100 in the present embodiment includes a pressing force adjustment mechanism 70 that adjusts a pressing force with which the pressure roller 59 presses the heater 51.

Figure 5:
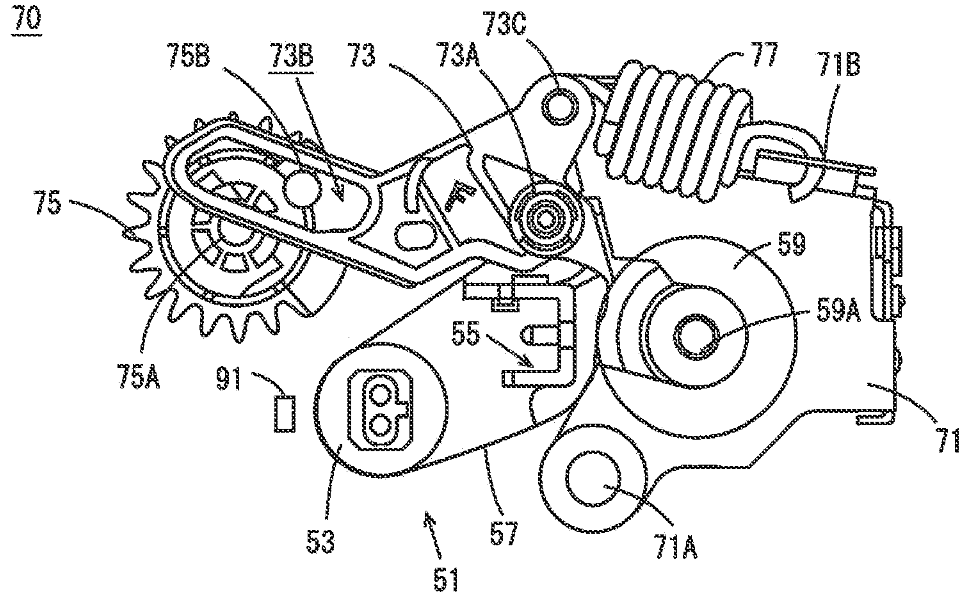
FIG. 5 is a diagram showing a pressing force adjustment mechanism.
Figure 6:
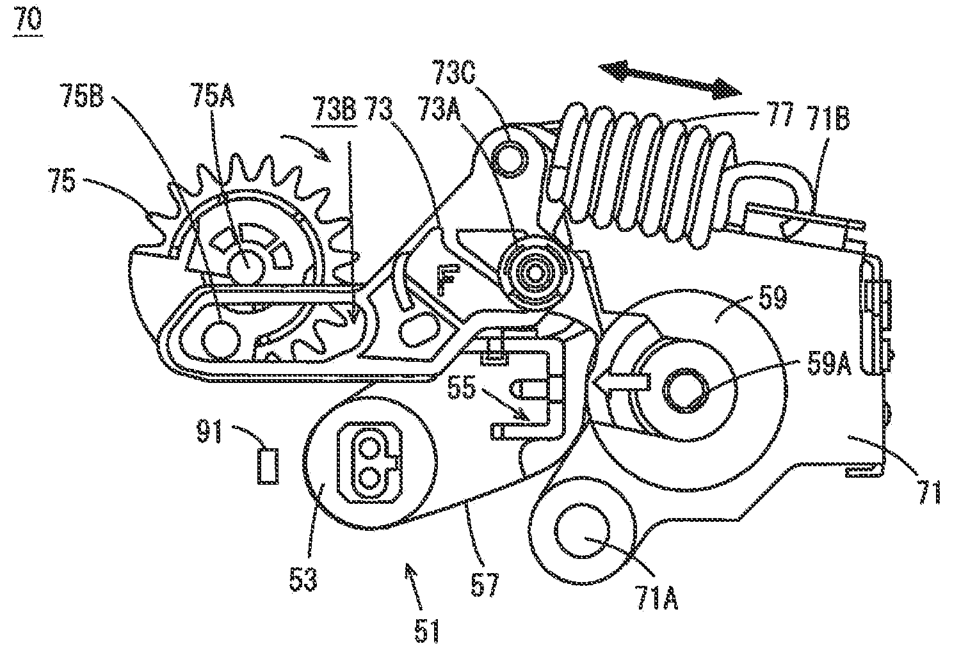
FIG. 6 is a diagram showing the pressing force adjustment mechanism.

FIGS. 5 and 6 are diagrams showing the pressing force adjustment mechanism. Referring to FIGS. 5 and 6, the pressing force adjustment mechanism 70 includes a pressure frame 71, a lever member 73, a load variable gear 75 and a spring 77. Both ends of the pressurizer 55 are fixedly supported at the main body frame.

The pressure frame 71 is supported so as to be rotatable about a pressure frame rotation shaft 71A. The pressure frame rotation shaft 71A is fixedly supported at the main body frame. The pressure frame 71 supports the rotation shaft 59A of the pressure roller 59. Therefore, the rotation shaft 59A of the pressure roller 59 is rotatable about the pressure frame rotation shaft 71A. Further, the pressure frame 71 has a first connecting portion 71B connected to one end of the spring 77.

The lever member 73 is supported so as to be rotatable about a lever member rotation shaft 73A. The lever member rotation shaft 73A is fixedly supported at the main body frame. Further, the lever member 73 includes a second connecting portion 73C connected to the other end of the spring 77. The spring 77 biases the pressure frame 71 and the lever member 73 in a direction in which the distance between the first connecting portion 71B and the second connecting portion 73C is to be shortened. Therefore, the pressure frame 71 is biased by the spring 77 in the counterclockwise direction about the pressure frame rotation shaft 71A, and the lever member 73 is biased by the spring 77 in the clockwise direction about the lever member rotation shaft 73A. Therefore, the pressure roller 59 is pressed in a direction toward the heater 51.

The load variable gear 75 has a gear rotation shaft 75A supported at the main body frame and an adjustment bar 75B parallel to the gear rotation shaft 75A. The load variable gear 75 is rotated by the drive motor 59B and is rotated about the gear rotation shaft 75A.

In the lever member 73, an adjustment hole 73B, which the adjustment bar 75B of the load variable gear 75 penetrates, is formed. When the load variable gear 75 is rotated in the clockwise direction, the adjustment bar 75B abuts against the side surface of the adjustment hole 73B and then slides on the side surface of the adjustment hole 73B. Thus, the lever member 73 is rotated about the lever member rotation shaft 73A. As a result, the other end of the spring 77 is pulled, and a biasing force of the spring 77 increases. Therefore, a pressing force for pressing the pressure roller 59 in the direction toward the heater 51 increases.

The printer 100 according to the present embodiment performs an adjustment operation in addition to an image forming operation of forming an image on a paper. The adjustment operation is an operation different from the image forming operation. The adjustment operation is an operation of controlling the fixing device 50 when an image is not being formed on a paper. The adjustment operation is performed during adjustment of the fixing device 50 before shipment of the printer 100 or during adjustment of the fixing device 50 after replacement of the fixing device 50 or the fixing belt 57.

The adjustment operation will now be described. In the fixing device 50 before the adjustment, grease is not spread over the entire inner peripheral surface of the fixing belt 57. When the fixing device 50 is driven in this state, a frictional force received by the fixing belt 57 at a portion of the fixing belt 57 in contact with the pressing member 63 is larger than a frictional force received by the fixing belt 57 with the grease spread over the entire inner circumferential surface of the fixing belt 57. Therefore, the rotation of the fixing belt 57 and the rotation of the pressure roller 59 may not be synchronized with each other. Therefore, when the image forming operation is performed without execution of the adjustment operation, the speed at which the fixing device 50 conveys a paper is lower than the speed of the paper passing through a nip portion where the intermediate transfer belt 30 and the secondary transfer roller 26 comes into contact with each other. When the conveyance speeds in two continuous portions are different, the paper is bent between the fixing device 50 and the nip portion where the intermediate transfer belt 30 and the secondary transfer roller 26 comes into contact with each other. Therefore, a toner image formed on the paper may come into contact with another portion and be ruined or the paper may get caught in the fixing device 50.

The adjustment operation is an operation of causing the fixing belt 57 to be idly rotated with a recording medium not passing through the fixing device 50. When the adjustment operation is performed, the grease is spread over the entire inner peripheral surface of the fixing belt 57. The adjustment operation is performed in response to reception of an externally input predetermined instruction. The externally input instruction is an input operation performed by a user who operates the printer 100 or a command received from a computer connected to the printer 100, for example.

Figure 7:
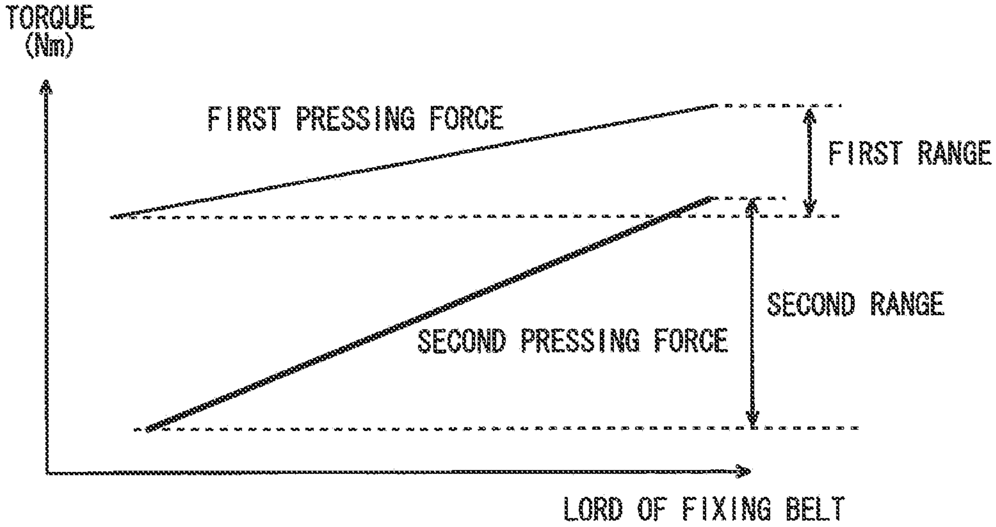
FIG. 7 is a diagram showing one example of a change in torque of a drive motor during an adjustment operation.

FIG. 7 is a diagram showing one example of a change in torque of the drive motor during the adjustment operation. The graph indicated by the thin line represents a change in torque of the drive motor 59B in a case in which a pressing force with which the pressure roller 59 presses the heater 51 is set to a first pressing force. The graph indicated by the thick line represents a change in torque of the drive motor 59B in a case in which a pressing force with which the pressure roller 59 presses the heater 51 is set to a second pressing force that is smaller than the first pressing force. A second range for the change in torque of the drive motor 59B in the case of the second pressing force is larger than a first range for the change in torque of the drive motor 59B in the case of the first pressing force.

With the fixing belt 57 idly rotated, the fixing belt 57 slides on the pressing member 63 and the grease applier 65. The portion that forms the nip portion N of the pressing member 63 is part of the portion in which the pressing member 63 slides on the fixing belt 57. Here, the portion forming the nip portion N of the pressing member 63 is referred to as a nip forming portion.

A rotational load of the fixing belt 57 includes a frictional force received from the pressing member 63 and the grease applier 65 and the moment of inertia of the heating roller 53. The moment of inertia of the heating roller 53 is constant. The frictional force received by the fixing belt 57 from the nip forming portion changes when the pressing force with which the pressure roller 59 presses the heater 51 changes. The frictional force received by the fixing belt 57 from the portion, other than the nip forming portion of the pressing member 63, and the grease applier 65 does not change even when the pressing force with which the pressure roller 59 presses the heater 51 changes.

Here, the frictional force received by the fixing belt 57 from the nip forming portion is referred to as FR1, and the frictional force received by the fixing belt 57 receives from the portion, other than the nip forming portion of the pressing member 63, and the grease applier 65 is referred to as FR2. The larger the pressing force with which the pressure roller 59 presses the heater 51, the larger the FR1. Therefore, the smaller the pressing force with which the pressure roller 59 presses the heater 51, the larger the ratio of FR2 with respect to FR1 (FR2/FR1).

As described above, a load of the fixing belt 57 is detected as a torque of the drive motor 59B. Therefore, a change amount of the FR2 is represented as a change in torque of the drive motor 59B. The smaller the ratio of the FR2 with respect to the FR1, in other words, the smaller the pressing force with which the pressure roller 59 presses the heater 51, the larger the ratio of the change amount of the FR2 with respect to the load of the fixing belt 57. Therefore, in a case in which the change amount of the FR2 is detected, the smaller the pressing force with which the pressure roller 59 presses the heater 51, the more accurately the change amount of the FR2 can be detected.

Therefore, in the printer 100 in the present embodiment, in a case in which the adjustment operation is performed, the fixing belt 57 is idly rotated with a pressing force with which the pressure roller 59 presses the heater 51 being made smaller than a pressing force that is used when the image forming operation is performed.

Figure 8:
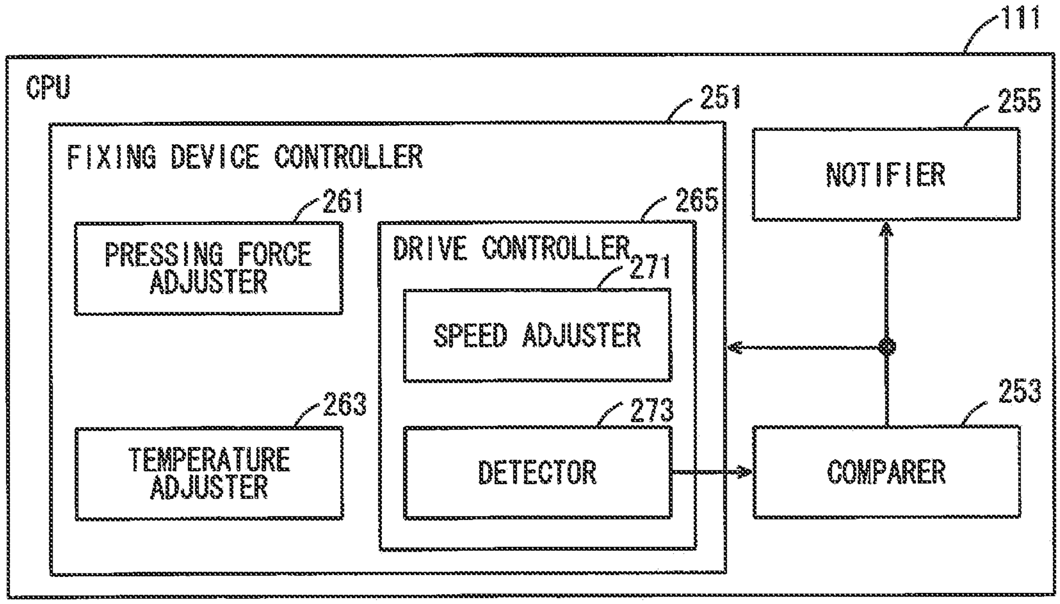
FIG. 8 is a block diagram showing one example of the functions of a CPU included in the printer in the present embodiment.

FIG. 8 is a block diagram showing one example of the functions of the CPU included in the printer in the present embodiment. The functions shown in FIG. 8 are the functions realized by execution of an adjustment program stored in the ROM 113, the HDD 115 or the CD-ROM 118 by the CPU 111 included in the printer 100. Referring to FIG. 8, the CPU 111 included in the printer 100 includes a fixing device controller 251 that controls the fixing device 50, a comparer 253 and a notifier 255.

The fixing device controller 251 includes a pressing force adjuster 261, a temperature adjuster 263 and a drive controller 265.

The pressing force adjuster 261 controls the pressing force adjustment mechanism 70 to adjust a pressing force with which the pressure roller 59 presses the pressing member 63. The pressing force adjuster 261 adjusts a pressing force with which the pressure roller 59 presses the pressing member 63 by causing the load variable gear 75 to be rotated. As a pressing force with which the pressure roller 59 presses the pressing member 63, the first pressing force for a period in which the image forming operation is performed and the second pressing force for a period in which the adjustment operation is performed are defined. The second pressing force is smaller than the first pressing force. The first pressing force is defined in regard to each of a plurality of types of papers. Therefore, the first pressing force has a certain range. The second pressing force is smaller than the minimum value of the first pressing force. During the image forming operation, the pressing force adjuster 261 rotates the load variable gear 75 to set a pressing force with which the pressure roller 59 presses the pressing member 63 to the first pressing force. Further, during the adjustment operation, the pressing force adjuster 261 rotates the load variable gear 75 to a pressing force with which the pressure roller 59 presses the pressing member 63 to the second pressing force.

The temperature adjuster 263 controls the heat source 61 to adjust the temperature of the heating roller 53. When the temperature adjuster 263 turns on the heat source 61, the temperature of the heating roller 53 rises. When the temperature adjuster 263 turns off the heat source 61, the temperature of the heating roller 53 is reduced. The temperature adjuster 263 receives a temperature of the heating roller 53 detected by the thermistor 91. The temperature adjuster 263 adjusts the temperature of the heating roller 53 by turning on or off the heat source 61 based on the temperature detected by the thermistor 91.

As the temperature of the heating roller 53, a first temperature for a period in which the image forming operation is performed and a second temperature for a period in which the adjustment operation is performed are defined. The second temperature is higher than the first temperature. The first temperature is defined in regard to each of a plurality of types of papers. Therefore, the first temperature has a certain range. The second temperature is higher than the maximum value of the first temperature. During the image forming operation, the temperature adjuster 263 turns on or off the heat source 61 such that the temperature of the heating roller 53 is the first temperature. During the adjustment operation, the temperature adjuster 263 turns on or off the heat source 61 such that the temperature of the heating roller 53 is the second temperature.

The drive controller 265 controls and drives the drive motor 59B. The drive controller 265 includes a speed adjuster 271 and a detector 273. The speed adjuster 271 adjusts the rotation speed of the drive motor 59B. Specifically, the speed adjuster 271 drives the drive motor 59B such that the rotation speed of the pressure roller 59 is constant. The rotation speed of the pressure roller 59 is detected by an encoder.

As the rotation speed of the pressure roller 59, a first rotation speed for a period in which the image forming operation is performed and a second rotation speed for a period in which the adjustment operation is performed are defined. The second rotation speed is higher than the first rotation speed. The first rotation speed is defined for each of a plurality of types of papers. Therefore, the first rotation speed has a certain range. The second rotation speed is higher than the maximum value of a first rotation speed. During the image forming operation, the speed adjuster 271 controls the drive motor 59B such that the pressure roller 59 is rotated at the first rotation speed. Further, during the adjustment operation, the speed adjuster 271 controls the drive motor 59B such that the pressure roller 59 is rotated at the second rotation speed.

The detector 273 detects a load of the fixing belt 57. The detector 273 detects a load of the fixing belt 57 by detecting a torque of the drive motor 59B. In the present embodiment, the drive controller 265 performs current control on the drive motor 59B. The detector 273 detects a load of the fixing belt 57 based on a current flowing through the drive motor 59B that rotates the pressure roller 59. A load of the fixing belt 57 is a load required to rotate the fixing belt 57 at a constant speed, and is also referred to as a rotational load. In a case in which the fixing belt 57 and the pressure roller 59 do not slide on each other, a load of the fixing belt 57 can be considered to be equal to a torque for rotating the pressure roller 59 at a constant speed. The detector 273 detects a torque for rotating the pressure roller 59 at a constant speed as a load of the fixing belt 57. The value of a current flowing through the drive motor 59B has a predetermined relationship with a torque for rotating the pressure roller 59 at a constant speed. With use of the relationship between a current value obtained in advance by an experiment or the like, and a torque, the detector 273 detects a torque for rotating the pressure roller 59 at a constant speed based on a current value received from the drive controller 265. The detector 273 outputs the torque for rotating the pressure roller 59 at a constant speed to the comparer 253.

The comparer 253 receives the torque of the pressure roller 59 from the detector 273. The comparer 253 compares the torque of the pressure roller 59 with a threshold value TH during the adjustment operation, and outputs a result of comparison to the drive controller 265 and the notifier 255. The threshold value TH corresponds to a load of the fixing belt 57 that is applied with the grease being spread over the entire inner peripheral surface of the fixing belt 57. The threshold value TH is a value obtained by an experiment or simulation. In a case in which the torque of the pressure roller 59 is larger than the threshold value TH, it can be determined that the grease is not yet spread over the inner peripheral surface of the fixing belt 57. Further, in a case in which the torque of the pressure roller 59 is equal to or smaller than the threshold value TH, it can be determined that the grease is spread over the entire inner peripheral surface of the fixing belt 57. In a case in which the rotational load of the fixing belt 57 is larger than the threshold value TH, the comparer 253 outputs an incompletion signal indicating that the grease is not yet spread over the inner peripheral surface of the fixing belt 57 to the drive controller 265 and the notifier 255. In a case in which the rotational load of the fixing belt 57 is equal to or smaller than the threshold value TH, the comparer 253 outputs a completion signal indicating that the grease is spread over the inner peripheral surface of the fixing belt 57 to the drive controller 265 and the notifier 255.

The notifier 255 receives either one of an incompletion signal and a completion signal from the comparer 253 during the adjustment operation. In a case in which the adjustment operation is abnormal, the notifier 255 provides notification that the adjustment operation is abnormal. Specifically, the notifier 255 provides notification in a case in which a completion signal is not received from the comparer 253 in a predetermined period of time since the start of the adjustment operation. For example, the notifier 255 displays in the display unit 161 that the fixing device 50 is in an abnormal state. The notifier 255 displays a message, an icon or the like in the display unit 161. Further, the notifier 255 may provide notification by causing a speaker to generate a sound. Further, the notifier 255 may output data representing that the fixing device 50 is in an abnormal state to an external device. Furthermore, the notifier 255 may transmit electronic data such as an electronic mail to an administrator.

Figure 9:
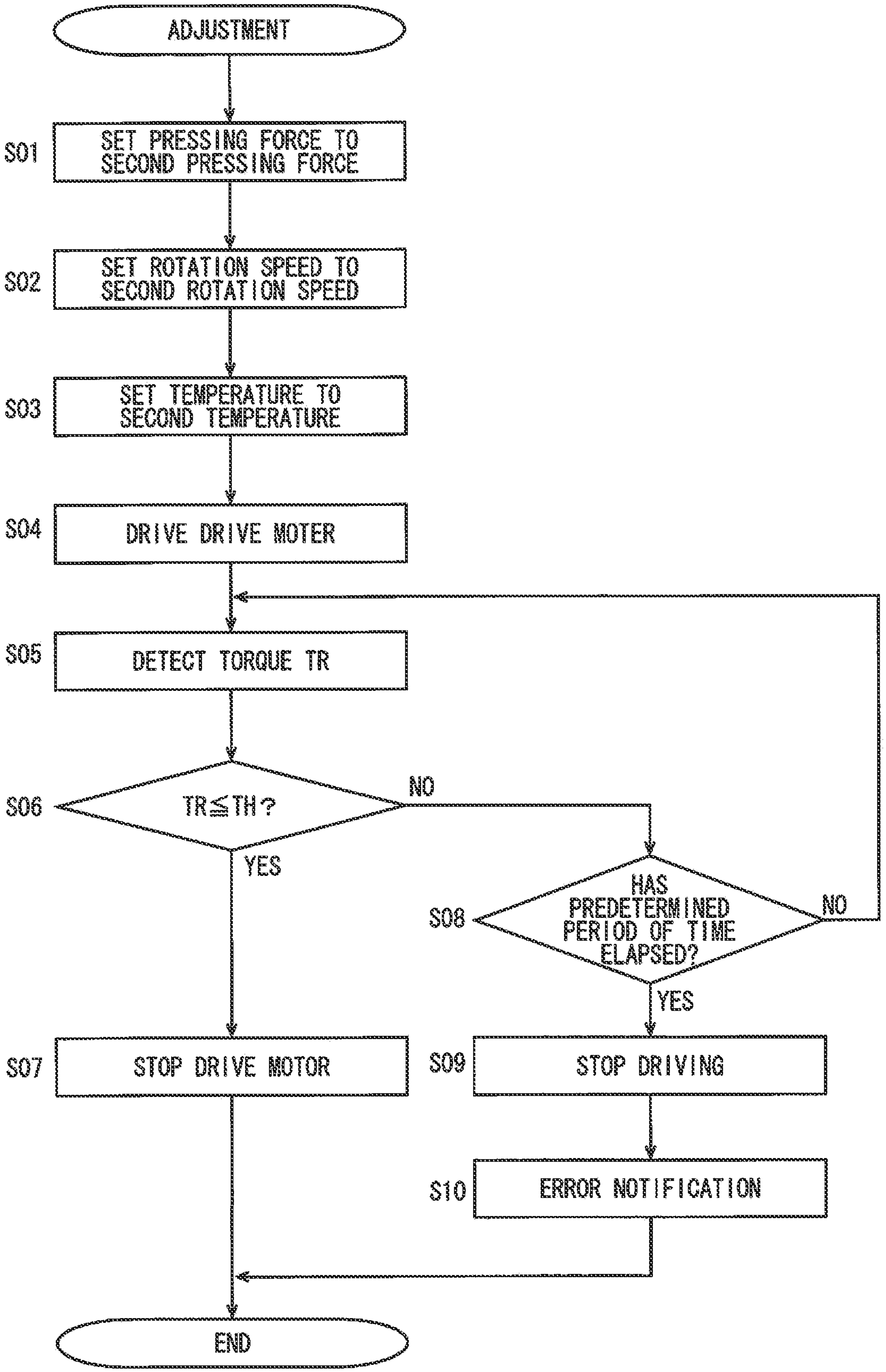
FIG. 9 is a flowchart showing one example of a flow of an adjustment process.

FIG. 9 is a flowchart showing one example of a flow of an adjustment process. The adjustment process is a process executed by the CPU in a case in which the CPU included in the printer 100 executes the adjustment program stored in the ROM 113, the HDD 115 or the CD-ROM 118. Referring to FIG. 8, the CPU 111 included in the printer 100 controls the pressing force adjustment mechanism 70 to set a pressing force with which the pressure roller 59 presses the pressing member 63 to the second pressing force (step S01). The second pressing force is smaller than the first pressing force that is set during the image forming operation.

In the next step S02, the pressure roller 59 is set to be rotated at the second rotation speed, and the process proceeds to the step S03. The rotation speed of the drive motor 59B is set such that the pressure roller 59 is rotated at the second rotation speed. The second rotation speed is higher than the first rotation speed set during the image forming operation.

In the step S03, the temperature of the heating roller 53 is set to the second temperature, and the process proceeds to the step S04. The heat source 61 is controlled such that the temperature of the heating roller 53 is the second temperature. Thus, the heat source 61 is controlled to be turned on or off such that a temperature detected by the thermistor 91 is maintained at the second temperature. The second temperature is higher than the first temperature set during the image forming operation.

In the step S04, the drive motor 59B is driven, and the process proceeds to the step S05. The drive motor 59B is rotated such that the pressure roller 59 is rotated at the second rotation speed that is set in the step S02. Thus, the fixing belt 57 starts to be idly rotated.

In the step S05, a torque value TR of the drive motor 59B is detected, and the process proceeds to the step S06. In the step S06, the torque value TR of the drive motor 59B is compared with the threshold value TH. In a case in which the torque value TR is equal to or smaller than the threshold value TH, the process proceeds to the step S07. If not, the process proceeds to the step S08. In the step S07, the drive motor 59B is stopped, and the adjustment process ends.

In the step S08, it is determined whether a predetermined period of time has elapsed since driving of the drive motor 59B. If the predetermined period of time has elapsed since driving of the drive motor 59B, the process proceeds to the step S09. If not, the process returns to the step S05. In the step S09, the drive motor 59B is stopped, and the process proceeds to the step S10.

In the step S10, error notification is provided, and the adjustment process ends.

As described above, the printer 100 in the present embodiment functions as an image forming apparatus. The printer 100 includes the pressure roller 59, the drive motor 59B that rotationally drives the pressure roller 59, the endless fixing belt 57, the pressing member 63 that is provided inside the fixing belt 57 and be opposite to the pressure roller 59 and forms the nip portion N in which the fixing belt 57 and the pressure roller 59 come into contact with each other, and the pressing force adjustment mechanism 70 that adjusts a pressing force for pressing the pressure roller 59 toward the pressing member 63. The CPU 111 controls the pressing force adjustment mechanism 70 and the drive motor 59B to rotate the pressure roller 59 with a pressing force set to the second pressing force smaller than the first pressing force, which is a normal value and set during the image forming operation. Because the pressure roller 59 is rotated with the second pressing force for pressing the pressure roller 59 toward the pressing member 63, the fixing belt 57 and the pressing member 63 slide on each other with the frictional force between the fixing belt 57 and the pressing member 63 being smaller than a frictional force generated during the image forming operation, which is a normal state. Therefore, a change in frictional force between the fixing belt 57 and the pressing member 63 can be detected more accurately during the adjustment operation than during the image forming operation which is a normal state. Therefore, because the grease being spread over the entire inner peripheral surface of the fixing belt 57 can be detected more accurately during the adjustment operation than during image formation, the fixing belt 57 can be adjusted efficiently.

Further, during the adjustment operation in which a paper does not pass through the nip portion N, the CPU 111 causes the pressure roller 59 to be rotated with a pressing force set to the second pressing force that is smaller than the first pressing force, which is a normal value and is set during image formation. Therefore, because the pressure roller 59 and the fixing belt 57 are in direct contact with each other, a predetermined frictional force can be ensured to be generated between the fixing belt 57 and the pressure roller 59.

Further, the CPU 111 detects a rotational load of the fixing belt 57 as a rotational torque of the drive motor 59B, and causes the pressure roller 59 to be rotated with a pressing force set to the second pressing force until the torque value TR is the threshold value TH. Therefore, it is possible to accurately detect a change in rotational load of the fixing belt 57.

In a case in which the torque value TR detected as a rotational torque of the drive motor 59B when the pressure roller 59 is rotated with the pressing force set to the second pressing force is equal to or smaller than the threshold value TH, the CPU 111 stops the rotation of the pressure roller 59. Therefore, when the rotational load of the fixing belt 57 is equal to or smaller than the predetermined value, the rotation of the pressure roller 59 is stopped. Thus, a period of time required for the adjustment operation can be shortened as much as possible. The adjustment operation is an operation of spreading the applied grease to the inner peripheral surface of the fixing belt 57.

Further, notification is provided in a case in which the torque value TR detected as a rotational torque of the drive motor 59B does not reach the threshold value TH in a predetermined period of time since the pressure roller 59 is rotated with the pressure roller 59 pressurized with the second pressing force. Therefore, because notification is provided in a case in which the rotational load of the fixing belt 57 cannot be reduced, notification can be provided in regard to an abnormal state of the printer 100.

Further, the printer 100 further includes the heat source 61 and the heating roller 53 that heat the fixing belt 57. During the adjustment operation, the CPU 111 controls the heat source 61 such that the temperature of the fixing belt 57 is the second temperature that is higher than the first temperature that is set during the image forming operation, during a period in which the pressure roller 59 is rotated while being pressed with the second pressing force. Therefore, because the fixing belt 57 is heated, the viscosity of the grease present on the inner peripheral surface of the fixing belt can be reduced.

Further, during the adjustment operation, the printer 100 causes the pressure roller 59 to be rotated at the second rotation speed faster than the first rotation speed of the pressure roller 59 that is set during the image forming operation, during a period in which the pressure roller 59 is rotated while being pressed with the second pressing force. Therefore, because the rotation speed of the fixing belt 57 is increased, the grease present on the inner peripheral surface of the fixing belt 57 can be quickly spread over the entire inner peripheral surface of the fixing belt 57.

First Modified Example

The adjustment operation is performed during adjustment of the fixing device 50 before shipment of the printer 100 or during adjustment of the fixing device 50 after replacement of the fixing device 50 or the fixing belt 57 by way of example, the present invention is not limited to this. The adjustment operation may be performed under a predetermined condition after the printer 100 performs the image forming operation. For example, the adjustment operation may be performed when images are formed on a predetermined number of recording media in the printer 100. In a case in which images are formed on the predetermined number of recording media in the printer 100, dust may enter the inner peripheral surface of the fixing belt 57, and the distribution of the grease may be non-uniform. In such a case, it is possible to distribute the grease to the entire inner peripheral surface of the fixing belt 57 by performing the adjustment operation.

Further, the adjustment operation may be performed in a case in which the fixing device 50 is not driven for a predetermined period of time. The inner circumferential surface of the fixing belt 57 includes a portion that comes into contact with the pressing member 63, the grease applier 65 and the heating roller 53 and a portion that does not come into contact with another member. Therefore, in a case in which the predetermined period of time elapses without the fixing device 50 being driven, the distribution of the grease on the inner peripheral surface of the fixing belt 57 may be non-uniform. In such a case, it is possible to distribute the grease to the entire inner peripheral surface of the fixing belt 57 by performing the adjustment operation.

Further, the adjustment operation may be performed when the power is turned on in a situation where the temperature is equal to or lower than a predetermined value, such as in winter. Since the viscosity of the grease applied to the inner peripheral surface of the fixing belt 57 is reduced, when the fixing device 50 is driven with the temperature of the grease being low, the distribution of the grease on the inner circumferential surface of the fixing belt 57 may be non-uniform. In such a case, it is possible to distribute the grease to the entire inner peripheral surface of the fixing belt 57 by performing the adjustment operation.

Second Modified Example

In the present embodiment, during the adjustment operation, the pressing force with which pressure roller 59 presses the pressing member 63 is set to the second pressing force, the rotation speed of the pressure roller 59 is set to the second rotation speed, and the temperature of the heating roller 53 is set to the second temperature. However, the invention is not limited to this. During the adjustment operation, the pressing force with which the pressure roller 59 presses the pressing member 63 may be set to the second pressing force. In this case, the rotation speed of the pressure roller 59 may be set to the first rotation speed, and the temperature of the heating roller 53 may be set to the first temperature.

Further, during the adjustment operation, the pressing force with which the pressure roller 59 presses the pressing member 63 may be set to the second pressing force, the rotation speed of the pressure roller 59 may be set to the second rotation speed, and the temperature of the heating roller 53 may be set to the first temperature. Further, during the adjustment operation, the pressing force with which the pressure roller 59 presses the pressing member 63 may be set to the second pressing force, the rotation speed of the pressure roller 59 may be set to the first rotation speed, and the temperature of the heating roller 53 may be set to the second temperature.

Third Modified Example

While the pressure roller 59 is pressed against the heater 51 in the above-mentioned embodiment, the heater 51 may be pressed against the pressure roller 59.

Fourth Modified Example

While the pressure roller 59 is driven and the fixing belt 57 is driven to be rotated in the present embodiment, the pressure roller 59 may be driven to be rotated. In this case, a motor that rotates the heating roller 53 is arranged instead of the drive motor 59B.

Fifth Modified Example

While the pressure roller 59 is pressed against the fixing belt 57 in the present embodiment, the pressure roller 59 may be spaced apart from the fixing belt 57 during a period in which the fixing device 50 is not driven. Preferably, the pressure roller 59 is pressed against the heater 51 at least during a period in which a paper passes through the nip portion N. Thus, it is possible to limit a period in which the pressure roller 59 is elastically deformed to a period in which a recording medium passes.

While the printer 100 is described as one example of the image forming apparatus in the present embodiment, the image forming apparatus may be a copying machine, a laser beam printer, a facsimile machine, a Multi Function Peripheral combining these, or the like.

While the printer 100 that forms a tandem color image is described as one example of an image forming apparatus in the present embodiment, the present invention is not limited to this. An image forming apparatus may be an image forming apparatus that forms a monochrome image. The configurations and arrangements of the image forming units 20Y, 20M, 20C, 20K, the exposure devices 21Y, 21M, 21C, 21K, the charging rollers 22Y, 22M, 22C, 22K, the photoreceptor drums 23Y, 23M, 23C, 23K, the developers 24Y, 24M, 24C, 24K, the primary transfer rollers 25Y, 25M, 25C, 25K, the secondary transfer roller 26 and the fixing device 50 are not limited to the present embodiment and may have other configurations and arrangements.

Although embodiments of the present invention have been described and illustrated in detail, the disclosed embodiments are made for purpose of illustration and example only and not limitation The scope of the present invention should be interpreted by terms of the appended claims.

What is claimed is:

1. An image forming apparatus comprising:

a pressure roller;

a driver that drives rotation of the pressure roller;

an endless fixing belt;

a pressing member that is provided inside the fixing belt and opposite to the pressure roller and forms a nip portion in which the fixing belt and the pressure roller come into contact with each other;

a pressing force adjustment mechanism that adjusts a pressing force for pressing one of the pressure roller and the pressing member toward another one of the pressure roller and the pressing member; and a drive controller that controls the pressing force adjustment mechanism and the driver to rotate the pressure roller with the pressing force being smaller than a normal value defined for a normal state, wherein the drive controller, during rotation of the pressure roller with the pressing force being smaller than the normal value, rotates the pressure roller at a speed higher than a rotation speed of the pressure roller in a state in which a recording medium is passing through the nip portion.

2. The image forming apparatus according to claim 1, wherein the drive controller, with a recording medium not passing through the nip portion, rotates the pressure roller with the pressing force being smaller than the normal value.

3. The image forming apparatus according to claim 1, further comprising a detector that detects a rotational load of the fixing belt, wherein the drive controller rotates the pressure roller with the pressing force being smaller than the normal value until a rotational load detected by the detector is equal to or smaller than a predetermined value.

4. The image forming apparatus according to claim 3, wherein the drive controller stops rotation of the pressure roller in a case in which a rotational load, detected by the detector when the pressure roller is rotated with the pressing force being smaller than the normal value, is equal to or smaller than the predetermined value.

5. The image forming apparatus according to claim 3, further comprising a notifier that provides notification in a case in which a rotational load, detected by the detector in a predetermined period of time since the drive controller rotates the pressure roller with the pressing force being smaller than the normal value, is not equal to or smaller than the predetermined value.

6. The image forming apparatus according to claim 1, further comprising a heat source that heats the fixing belt, wherein the drive controller, during rotation of the pressure roller with the pressing force being smaller than the normal value, controls the heat source to heat the fixing belt with thermal energy that is higher than thermal energy required when a recording medium is passing through the nip portion.

7. An adjustment method of controlling an image forming apparatus, the image forming apparatus comprising:

a pressure roller;

a driver that drives rotation of the pressure roller;

an endless fixing belt;

a pressing member that is provided inside the fixing belt and opposite to the pressure roller and forms a nip portion in which the fixing belt and the pressure roller come into contact with each other; and a pressing force adjustment mechanism that adjusts a pressing force for pressing one of the pressure roller and the pressing member toward another one of the pressure roller and the pressing member, and the adjustment method including:

a pressing force adjustment step of controlling the pressing force adjustment mechanism to cause the pressing force to be smaller than a normal value defined for a normal state; and a drive controlling step of controlling the driver to rotate the pressure roller with the pressing force being smaller than the normal value, wherein the drive controlling step, during rotation of the pressure roller with the pressing force being smaller than the normal value, includes rotating the pressure roller at a speed higher than a rotation speed of the pressure roller in a state in which a recording medium is passing through the nip portion.

8. The adjustment method according to claim 7, wherein the drive controlling step includes, with a recording medium not passing through the nip portion, rotating the pressure roller with the pressing force being smaller than the normal value.

9. The adjustment method according to claim 7, wherein the image forming apparatus further includes a detector that detects a rotational load of the fixing belt, and the drive controlling step includes rotating the pressure roller with the pressing force being smaller than the normal value until a rotational load detected by the detector is equal to or smaller than a predetermined value.

10. The adjustment method according to claim 9, wherein the drive controlling step includes stopping rotation of the pressure roller in a case in which a rotational load, detected by the detector when the pressure roller is rotated with the pressing force being smaller than the normal value, is equal to or smaller than the predetermined value.

11. The adjustment method according to claim 9, further including a notifying step of providing notification in a case in which a rotational load, detected by the detector in a predetermined period of time since the pressure roller is rotated with the pressing force being smaller than the normal value in the drive controlling step, is not equal to or smaller than predetermined value.

12. The adjustment method according to claim 7, wherein the image forming apparatus further includes a heat source that heats the fixing belt, and the drive controlling step, during rotation of the pressure roller with the pressing force being smaller than the normal value, includes controlling the heat source to heat the fixing belt with thermal energy that is higher than thermal energy required when a recording medium is passing through the nip portion.

13. A non-transitory computer-readable recording medium encoded with an adjustment program executed in a computer that controls an image forming apparatus, the image forming apparatus comprising:

a pressure roller;

a driver that drives rotation of the pressure roller;

an endless fixing belt;

a pressing member that is provided inside the fixing belt and opposite to the pressure roller and forms a nip portion in which the fixing belt and the pressure roller come into contact with each other; and a pressing force adjustment mechanism that adjusts a pressing force for pressing one of the pressure roller and the pressing member toward another one of the pressure roller and the pressing member; and the adjustment program causes the computer to perform:

a pressing force adjustment step of controlling the pressing force adjustment mechanism to cause the pressing force to be smaller than a normal value defined for a normal state; and a drive controlling step of controlling the driver to rotate the pressure roller with the pressing force being smaller than the normal value, wherein the drive controlling step, during rotation of the pressure roller with the pressing force being smaller than the normal value, includes rotating the pressure roller at a speed higher than a rotation speed of the pressure roller in a state in which a recording medium is passing through the nip portion.

* * * * *